(12) United States Patent
Tachibana et al.

(10) Patent No.: US 12,132,812 B2
(45) Date of Patent: Oct. 29, 2024

(54) DATA TRANSFER CIRCUIT AND COMMUNICATION APPARATUS

(71) Applicant: NTT ELECTRONICS CORPORATION, Yokohama (JP)

(72) Inventors: Masahiro Tachibana, Yokohama (JP); Mami Mikami, Yokohama (JP); Yuki Yoshida, Yokohama (JP)

(73) Assignee: NTT ELECTRONICS CORPORATION, Yokohama (JP)

( * ) Notice: Subject to any disclaimer, the term of this patent is extended or adjusted under 35 U.S.C. 154(b) by 44 days.

(21) Appl. No.: 18/000,621

(22) PCT Filed: May 27, 2021

(86) PCT No.: PCT/JP2021/020173
§ 371 (c)(1),
(2) Date: Dec. 2, 2022

(87) PCT Pub. No.: WO2021/256206
PCT Pub. Date: Dec. 23, 2021

(65) Prior Publication Data
US 2023/0216653 A1 Jul. 6, 2023

(30) Foreign Application Priority Data
Jun. 15, 2020 (JP) .................................. 2020-102857

(51) Int. Cl.
*H04L 7/00* (2006.01)
*G06F 5/06* (2006.01)

(52) U.S. Cl.
CPC .............. *H04L 7/0016* (2013.01); *G06F 5/06* (2013.01); *H04L 7/005* (2013.01)

(58) Field of Classification Search
CPC ......... H04L 7/0016; H04L 7/005; H04L 7/02; H04L 7/033; G06F 5/06; G06F 1/12; H03L 7/18; H04B 10/60; H04B 10/6164
See application file for complete search history.

(56) References Cited

U.S. PATENT DOCUMENTS

| | | | |
|---|---|---|---|
| 5,598,445 A * | 1/1997 | Castano Pinto | H04J 3/076 370/506 |
| 6,519,722 B1 * | 2/2003 | Wiggins | G06F 5/06 714/707 |

(Continued)

FOREIGN PATENT DOCUMENTS

| | | |
|---|---|---|
| JP | 2003-134076 A | 5/2003 |
| JP | 2006-261812 A | 9/2006 |

(Continued)

OTHER PUBLICATIONS

International Preliminary Report on Patentability received for PCT Patent Application No. PCT/JP2021/020173, mailed on Dec. 29, 2022, 9 pages (5 pages of English Translation and 4 pages of Original Document).

(Continued)

*Primary Examiner* — Betsy Deppe
(74) *Attorney, Agent, or Firm* — WOMBLE BOND DICKINSON (US) LLP

(57) ABSTRACT

A data transfer circuit according to the invention includes a memory configured to write data in accordance with a write pointer in synchronization with a first clock, and read out the data in accordance with a readout pointer in synchronization with a second clock, a clock generation circuit configured to generate the second clock by multiplying a reference clock by a rational number N, a frequency error estimation circuit configured to estimate a frequency error between the first clock and the second clock based on a change amount of a pointer difference between the write pointer and the readout (Continued)

pointer, and an adjustment circuit configured to output, as an adjustment multiple $\Delta N$, a value obtained by dividing the estimated frequency error by a frequency of the reference clock. The clock generation circuit generates the second clock by multiplying the reference clock by a rational number $(N+\Delta N)$.

8 Claims, 5 Drawing Sheets

(56) References Cited

U.S. PATENT DOCUMENTS

| | | | |
|---|---|---|---|
| 8,239,607 B2 * | 8/2012 | LaBerge | G11C 29/025 |
| | | | 711/167 |
| 9,054,821 B2 * | 6/2015 | Chen | H04L 7/033 |
| 10,990,120 B2 * | 4/2021 | Nair | G06F 1/12 |
| 2003/0076911 A1 | 4/2003 | Kobayashi et al. | |
| 2016/0202722 A1 | 7/2016 | Kuwata | |

FOREIGN PATENT DOCUMENTS

| | | |
|---|---|---|
| JP | 2013-062687 A | 4/2013 |
| JP | 2016-130921 A | 7/2016 |

OTHER PUBLICATIONS

International Search Report and Written Opinion received for PCT Patent Application No. PCT/JP2021/020173, mailed on Jul. 27, 2021, 11 pages (5 pages of English Translation and 6 pages of Original Document).

* cited by examiner

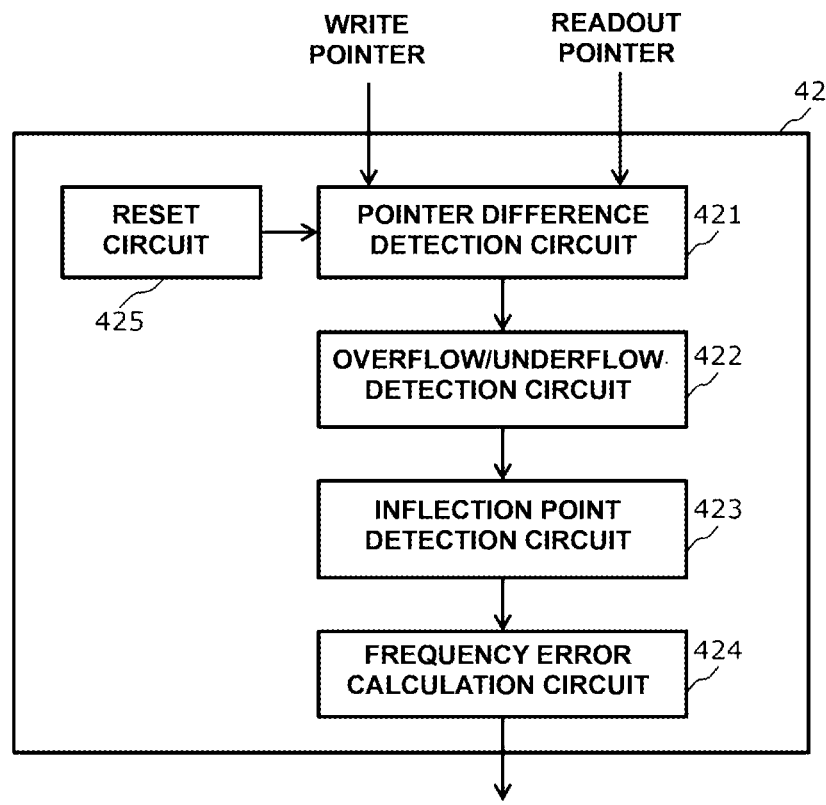
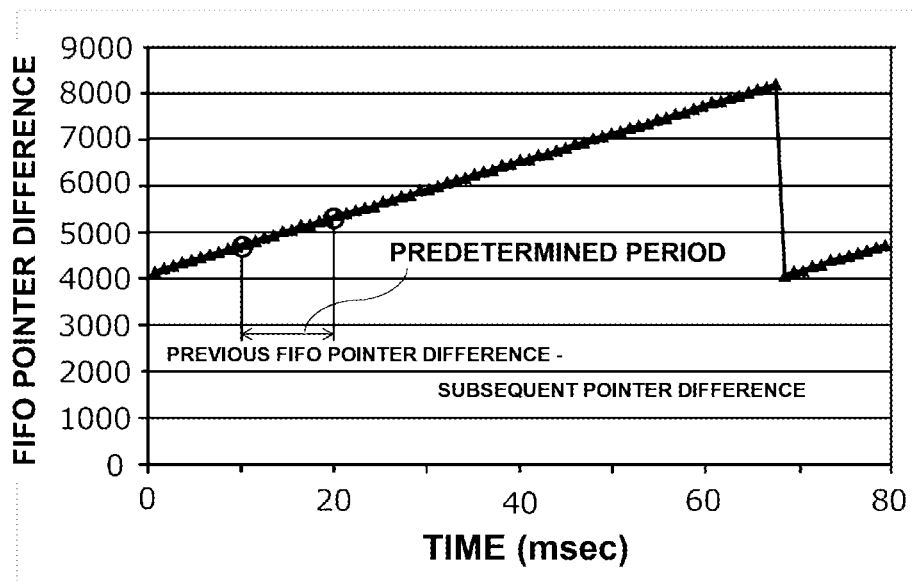

DATA TRANSFER CIRCUIT AND COMMUNICATION APPARATUS

TECHNICAL FIELD

The present invention relates to a data transfer circuit accompanied by clock synchronization in data communication.

BACKGROUND ART

In coherent optical communication, a client-side data signal is transported onto a line-side clock and optically transmitted, and then line-side data is transported onto a client-side clock to perform communication. In this case, on the transmission side, a clock is generally recovered from a client-side data signal in a clock recovery circuit (CDR) and can be used as a line-side clock.

On the reception side, a line-side clock and a client-side clock have a frequency error. A client-side clock synchronized with a line-side clock is generally recovered by a FIFO (First-In First-Out) and a PLL (Phase Locked Loop). Data from the line side is transferred to the client side based on the recovered client-side clock.

Patent Literature 1 discloses a synchronization method for a client-side clock and a line-side clock using a FIFO and a PLL. The embodiment discloses a method of generating a line-side clock synchronized with a client-side clock. Client-side data is written in the FIFO in accordance with a client-side clock, and a data signal is read out as line-side data from the FIFO using a line-side clock. Patent Literature 1 also describes that this method is applicable to even a method of generating a client-side clock synchronized with a line-side clock.

As shown in FIG. 6, the data transfer circuit 60 disclosed in Patent Literature 1 includes a FIFO 61, a pointer difference detection circuit 62, a comparison circuit 63, a frequency control circuit 64, and a PLL 65. The PLL 65 includes a frequency division circuit 66, a phase comparison circuit 67, a LPF 68, and a VCO. A reference number "70" represents a line-side circuit. A line-side clock is generated by the PLL 65. A data signal is written in the FIFO 61 in accordance with a write pointer and read out in accordance with a readout pointer. In Patent Literature 1, it is detected whether the difference between the write pointer and the readout pointer is larger than the upper limit value of an allowable range or smaller than the lower limit value of the allowable range. Based on the detection result, the frequency control circuit 64 is controlled to reset the frequency division operation of the PLL 65 and adjust the timing of the lead/lag of the phase of a frequency division clock. The pointer difference is controlled to always fall within the allowable range, and the synchronization between the line-side clock and the client-side clock can be established.

In Patent Literature 2, the difference between the frequency of a clock and that of a transmission data rate is obtained based on the difference per unit time of the data amount of transmission data stored in a FIFO, and the frequency division ratio of a PLL that generates a clock is so set as to eliminate the difference.

RELATED ART LITERATURE

Patent Literature

Patent Literature 1: Japanese Patent Laid-Open No. 2016-130921

Patent Literature 2: Japanese Patent Laid-Open No. 2013-062687

DISCLOSURE OF INVENTION

Problem to be Solved by the Invention

However, in the data transfer circuit 60 disclosed in Patent Literature 1, the frequency division number is controlled in accordance with the comparison in size between the allowance and the difference between the write and readout pointers of the FIFO 61. If the frequency difference decreases, the number of times of control decreases and it may take a long time to establish a synchronization.

In Patent Literature 2, the difference between the frequency of the clock and that of the transmission data rate is obtained based on the difference in data amount and the time required. However, no detailed method is disclosed, and variations caused by disturbance or the like may not be coped with.

The present invention has been made to solve the above-described problems, and has as its object to provide a data transfer circuit capable of speeding up clock synchronization.

Means of Solution to the Problem

To solve the above-described problems, according to the present invention, there is provided a data transfer circuit comprising a memory configured to write data in accordance with a write pointer in synchronization with a first clock, and read out the data in accordance with a readout pointer in synchronization with a second clock, a clock generation circuit configured to generate the second clock by multiplying a reference clock by a rational number N, a frequency error estimation circuit configured to estimate a frequency error between the first clock and the second clock based on a change amount of a pointer difference between the write pointer and the readout pointer, and an adjustment circuit configured to output, as an adjustment multiple $\Delta N$, a value obtained by dividing the estimated frequency error by a frequency of the reference clock, wherein the clock generation circuit generates the second clock by multiplying the reference clock by a rational number $(N+\Delta N)$ using the adjustment multiple $\Delta N$ output from the adjustment circuit.

Effect of the Invention

The present invention can provide a data transfer circuit capable of speeding up clock synchronization.

BRIEF DESCRIPTION OF DRAWINGS

FIG. 3 is a block diagram showing the arrangement of a frequency error estimation circuit according to the embodiment of the present invention;

FIG. 4 is a graph showing a temporal change of the pointer difference of a FIFO according to the embodiment of the present invention;

BEST MODE FOR CARRYING OUT THE INVENTION

An embodiment of the present invention will now be described with reference to the accompanying drawings. The present invention can be implemented in many different modes and should not be interpreted to be limited to the following embodiment of the invention.

Summary of Present Invention

The present invention is related to a data transfer circuit that extracts line data synchronized with a line-side clock in accordance with a client-side clock and transfers it to a client-side circuit.

The data transfer circuit according to the present invention is configured to write line data in a FIFO (memory) in accordance with a line-side clock (first clock/second clock), and read it in accordance with a client-side clock (first clock/second clock). When a client-side clock is generated by multiplying a reference clock by a rational number N, the data transfer circuit according to the present invention estimates a frequency error between the line-side clock and the client-side clock based on the change amount of a pointer difference per unit time between write and readout pointers in the FIFO. In the data transfer circuit according to the present invention, an adjustment multiple ΔN corresponding to the estimated frequency error is added to the above-described rational number N, and the reference clock is multiplied by the rational number (N+ΔN), generating a client-side clock. As a result, the frequency of the client-side clock can fall within a predetermined frequency error between the frequency of the client-side clock and that of the line-side clock.

The data transfer circuit according to the embodiment can shorten the synchronization time because a frequency division number corresponding to the frequency error is set by one control, unlike a conventional method of gradually setting a frequency division number. If the data transfer circuit is configured to set, at the center of the measurement range of the pointer difference, a value at the start of measurement in estimating a frequency error from the change amount of the pointer difference, it becomes easy to grasp a subsequent state change and calculate a frequency error. Further, if the data transfer circuit is configured to exclude an unexpected pointer difference exceeding a predetermined allowable range and a frequency error exceeding a predetermined allowance from frequency error estimation processing, degradation of the accuracy of frequency error estimation can be prevented.

<Communication Apparatus Including Data Transfer Circuit>

Figure 1:
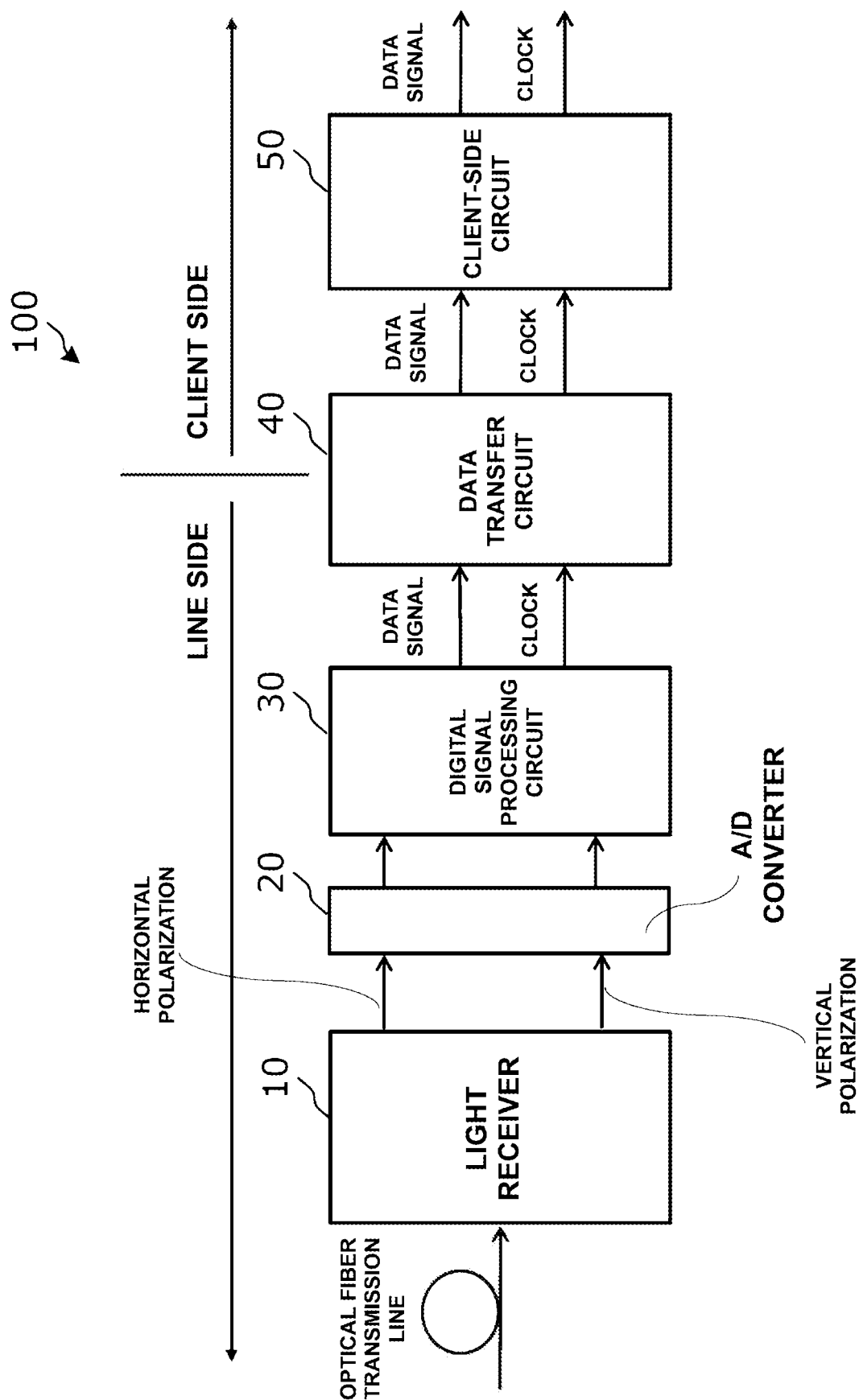
FIG. 1 is a block diagram showing the arrangement of a communication apparatus including a data transfer circuit according to an embodiment of the present invention.

FIG. 1 is a block diagram showing the arrangement of a communication apparatus including a data transfer circuit according to an embodiment of the present invention. FIG. 1 shows an example of the arrangement of a light receiving device 100 in an optical communication system.

The light receiving device 100 includes a light receiver 10, an A/D converter 20, a digital signal processing circuit 30, a data transfer circuit 40, and a client-side circuit 50. A light signal having passed through an optical fiber transmission line is separated into a horizontally polarized signal and a vertically polarized signal in the light receiver 10, and these signals are converted into electrical signals. In this case, the light signal need not be transmitted by two polarized signals and can also be transmitted by one polarized signal.

The reception signal converted into the electrical signal is converted into a digital signal by the A/D converter 20. The waveform distortion of the digital signal is compensated by chromatic dispersion compensation, frequency/phase variation compensation, polarization dispersion compensation, and the like in the digital signal processing circuit 30. Error correction can also be finally performed by an error correction circuit. In general, a processing system up to here is called a line side.

Then, the data transfer circuit 40 transfers the data from the line side to the client-side network. At this time, the clock of the client-side network and that of the line-side circuit are not always synchronized, so the clock generation circuit of the data transfer circuit 40 establishes a synchronization between them. That is, a line-side data signal from the digital signal processing circuit 30 is transported onto a client-side clock established by the clock generation circuit of the data transfer circuit 40, and transferred to the client-side circuit 50.

<Data Transfer Circuit>

Figure 2:
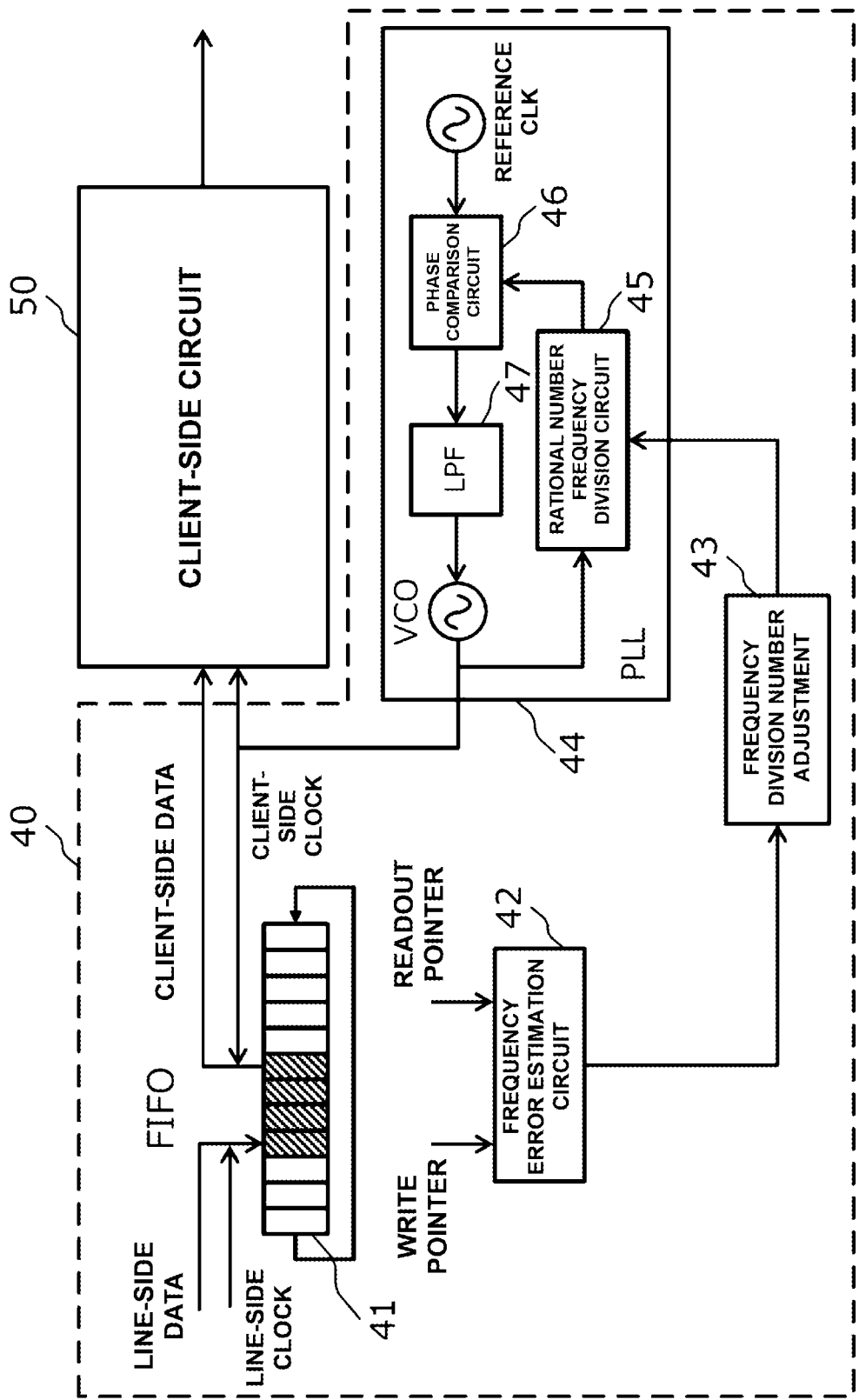
FIG. 2 is a block diagram showing the arrangement of the data transfer circuit according to the embodiment of the present invention.

FIG. 2 is a block diagram showing the arrangement of the data transfer circuit according to the embodiment of the present invention. FIG. 3 is a block diagram showing the arrangement of a frequency error estimation circuit.

The data transfer circuit 40 according to the embodiment can include a FIFO 41, a frequency error estimation circuit 42, a frequency division number adjustment circuit 43, and a PLL 44 serving as a clock generation circuit. The FIFO 41 can be, for example, a ring buffer type that feeds back data at the final stage to the first stage. The FIFO can be constituted by a memory. When writing data, data is written every write clock at an address indicated by a write pointer. When reading out data, data is read out every readout clock from an address indicated by a readout pointer. Each pointer is incremented every corresponding clock. The frequency error estimation circuit 42 and the frequency division number adjustment circuit 43 can be mounted in hardware such as an FPGA (Field Programmable Gate Array).

The frequency error estimation circuit 42 detects a pointer difference from the write and readout pointers of the FIFO 41, and calculates a frequency error between the line-side clock and the client-side clock from the change amount of the pointer difference with respect to the time. The frequency division number adjustment circuit 43 calculates a frequency division number corresponding to the frequency error estimated by the frequency error estimation circuit 42. A rational number frequency division circuit 45 of the PLL 44 adds, to a current frequency division number, a frequency division number corresponding to the frequency error, and performs frequency division using the adjusted frequency division number.

In the FIFO 41, a line-side data signal is written based on the line-side clock, and the written data is read out as a client-side data signal based on the client-side clock. Here, f1 represents the frequency of the line-side clock, and f2 represents the frequency of the client-side clock.

The line-side data signal is written in the FIFO 41 every line-side clock in accordance with the write pointer, and the client-side data signal is read out from the FIFO 41 every client-side clock in accordance with the readout pointer.

Here, Pw(t) represents the write pointer at time t, and Pr(t) represents the readout pointer.

When processing each bit, the line-side clock and the client-side clock have a frequency corresponding to 1 bit. When parallel processing M bits, the clock can be 1/M. The latter method is generally adopted.

The PLL 44 includes a voltage controlled oscillator (VCO) that generates a client-side clock, the rational number frequency division circuit 45 that divides the frequency of the output by a rational number, a reference clock (frequency fr), a phase comparison circuit 46, and a low-pass filter (LPF) 47.

The PLL 44 can be formed from a general PLL and is not limited to the above-described arrangement. If an input frequency to the phase comparison circuit 46 is fr, the reference clock may be a signal generated from another source vibration. The rational number frequency division circuit 45 can be implemented so that high-precision numerical calculation processing can be performed, and an oscillator using this numerical calculation processing is well known as a numerically controlled oscillator (NCO).

The frequency error estimation circuit 42 detects a difference $\Delta P(t)=Pw(t)-Pr(t)$ as a pointer difference between the write and readout pointers of the FIFO 41, and calculates a frequency error between the line-side clock and the client-side clock from the change amount of the pointer difference with respect to the time.

When the frequency of the line-side clock and that of the client-side clock completely coincide with each other, the pointer difference is constant with respect to the time. Even if the pointer difference slightly varies, it is constant on average. When the frequency of the line-side clock is higher than that of the client-side clock, write is faster than readout and the pointer difference decreases with time.

To the contrary, when the frequency of the line-side clock is lower than that of the client-side clock, write is slower than readout and the pointer difference increases with time. When one pointer corresponds to one clock, the gradient of the pointer difference with respect to the time represents a frequency error.

Even if neither the write pointer Pw(t) nor the readout pointer Pr(t) can be detected from the FIFO 41, the pointer difference $\Delta P(t)$ can be directly detected by the function of the FIFO 41. Hence, the pointer difference with respect to the time can be graphed by sequentially detecting a pointer difference in every predetermined time.

Figure 5:
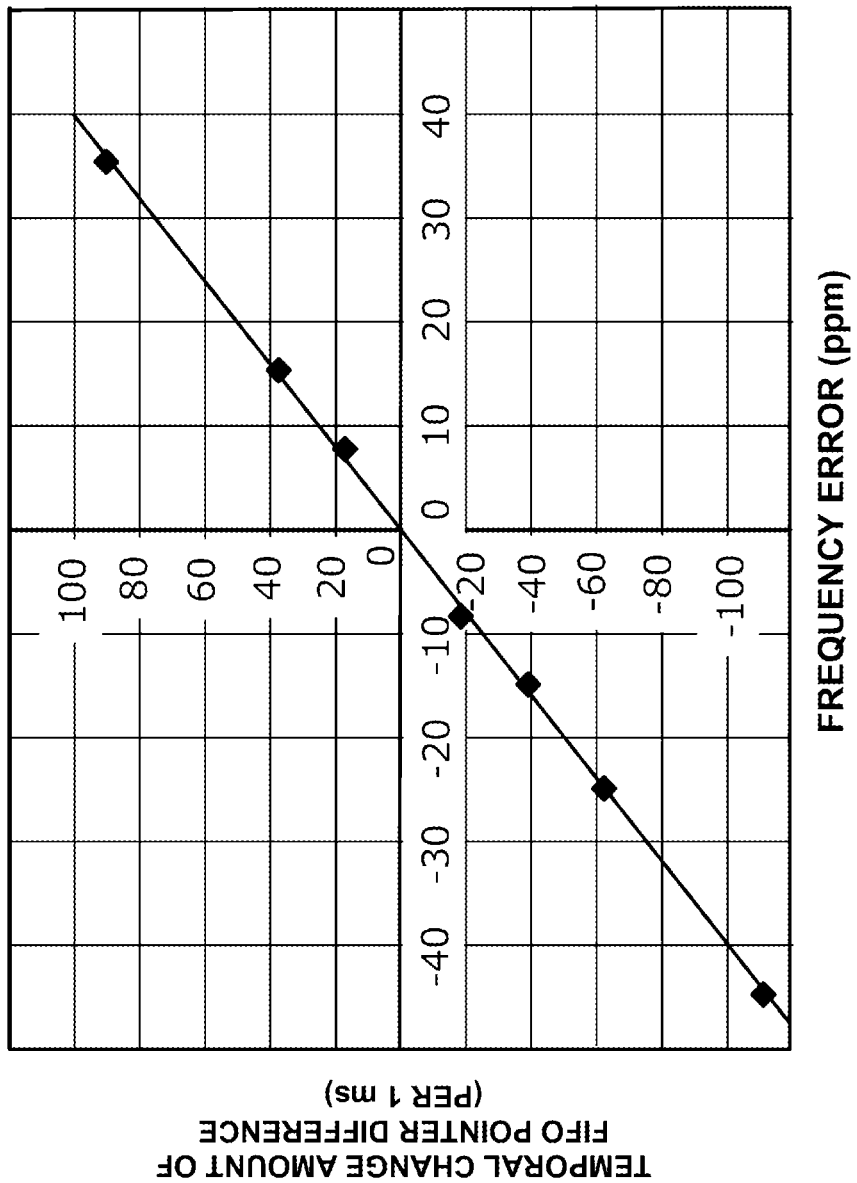
FIG. 5 is a graph showing the relationship between the frequency error and the temporal change amount of the pointer difference of the FIFO according to the embodiment of the present invention.
Figure 6:
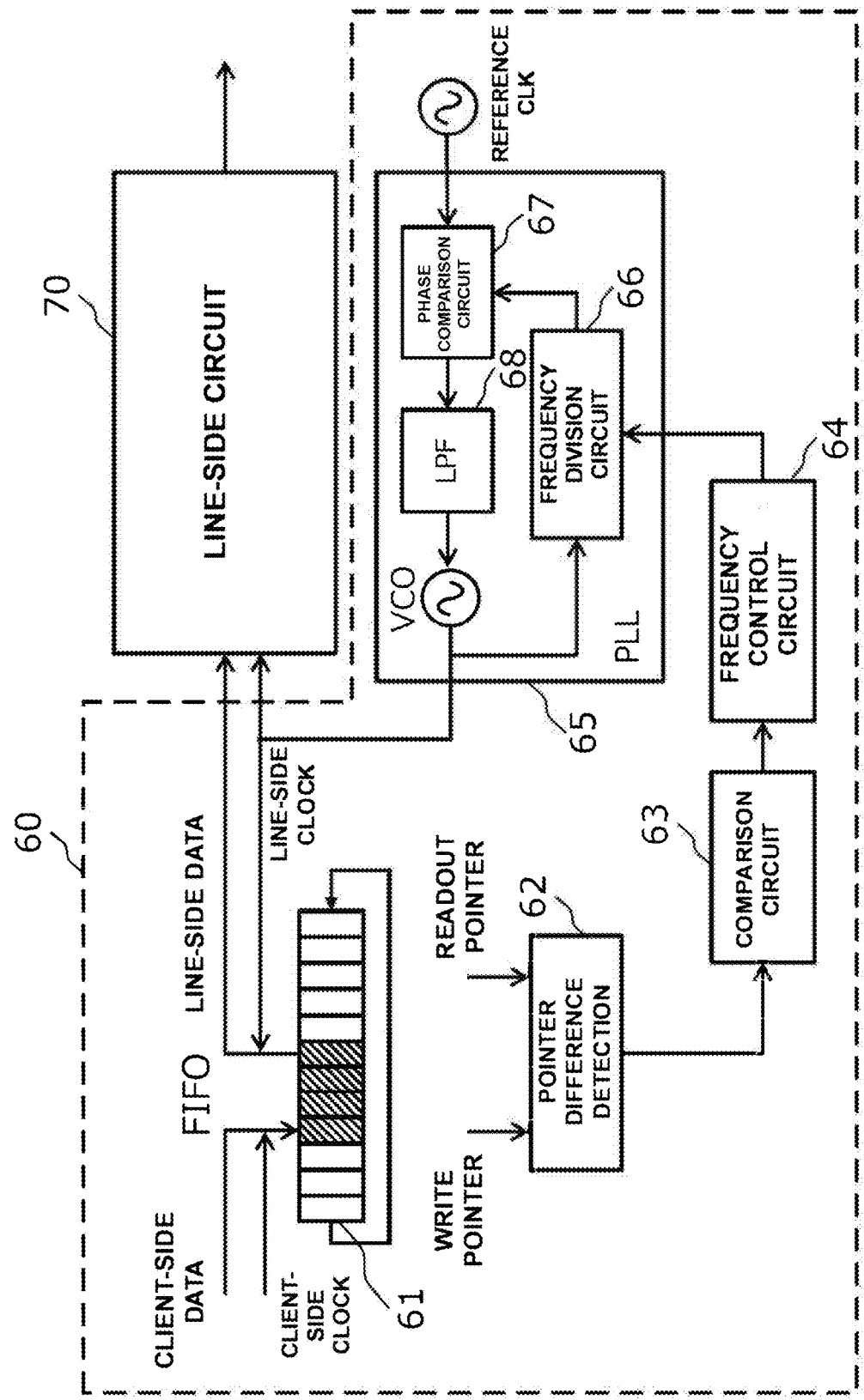
FIG. 6 shows an example of the arrangement of a conventional data transfer circuit.

FIG. 4 is a graph showing a temporal change of the pointer difference of a FIFO according to the embodiment of the present invention. FIG. 5 is a graph showing the relationship between the frequency error and the temporal change amount of the pointer difference of the FIFO according to the embodiment of the present invention. FIG. 5 shows a measured change amount of the pointer difference of the FIFO per 1 msec when the frequency of the client-side clock is set at a plurality of frequency errors with respect to the frequency of an arbitrary line-side clock. In FIG. 5, the line-side clock is 700 MHz.

In FIG. 4, the initial value of the pointer difference of the FIFO 41 is 4,096 at the start (time=0 msec) of measurement. The initial value can be set by resetting the FIFO 41 at the start of measurement.

For example, the pointer differences can be detected from 0 to 8,192 pointers. In this case, even if the pointer difference at the start of detection is 6,000 pointers, the initial value at the start of detection can be set to 4,096 by resetting. The initial value of the pointer difference is set by providing a reset circuit 425 in the frequency error estimation circuit 42 and inputting a reset signal from the reset circuit 425 to a pointer difference detection circuit 421 at the start of detection. In this case, an actual pointer difference of 6,000 pointers is regarded as 4,096 pointers.

In the above example, the upper limit of a detectable pointer difference is 8,192 and the lower limit is 0. With this setting, a pointer difference from the initial value of 4,096 to +4,096 can be counted. When the pointer difference reaches the upper or lower limit value, it is reset and is kept counted again from the initial value, as shown in FIG. 4. Since the absolute pointer difference is forcedly changed to the center value of the counter value at the start of measurement, it becomes easy to grasp the degree of change of the pointer difference and perform estimation calculation of a frequency error.

In the above example, the pointer value is expressed as a positive value to simplify calculation. However, when the pointer value can be expressed as positive and negative values, it is also possible to set 0 as the initial value when resetting the FIFO 41, and set +4,096 as the upper limit and −4,096 as the lower limit.

Even if the pointer difference is set at the center value of the counter value at the start of measurement, it may exceed (overflow/underflow) the upper or lower limit value of a predetermined measurement range during one measurement period in, for example, a case in which an error is very large or the measurement period is long. In designing, a maximum frequency error determined from specifications is assumed, and the upper and lower limit values and the measurement period are determined not to generate the above-described overflow and underflow.

However, the overflow and underflow sometimes occur owing to a design not complying with specifications, a failure, an accident, an unexpected environmental change, or the like. To cope with such a situation, the frequency error estimation circuit 42 according to the embodiment includes an overflow/underflow detection circuit 422 (first detection circuit) to detect an overflow and underflow in which the counter value exceeds the upper or lower limit value of a predetermined allowable range in a predetermined time. The measurement value of a specific pointer difference exceeding the predetermined allowable range can be excluded from measurement values for estimating a frequency error.

A temporal frequency variation (unexpected frequency change) may occur during the measurement period. The frequency error estimation circuit 42 can also be configured to exclude such a temporal frequency variation from measurement. More specifically, the frequency error estimation circuit 42 according to the embodiment can include an inflection point detection circuit 423 (second detection circuit) to monitor a change of the pointer difference with respect to the time, detect the presence/absence of an inflection point in the change amount of the frequency error, and exclude a specific frequency error at the inflection point from the measurement target.

For example, when a pointer difference is detected every 1 msec to estimate a frequency error, the frequency error can be estimated based on a difference between pointer differences of every 1 msec. Further, a change amount from a frequency error detected at next 1 msec is detected. This change amount coincides with the result of two differentiations on a pointer difference with respect to the time, and represents the degree of change of the pointer difference. When the value of the change amount becomes larger than a predetermined allowance, it is considered that a temporal frequency variation has occurred, and this frequency error is excluded from data of frequency error estimation. The temporal frequency variation can be excluded from measurement, and a frequency error can be accurately estimated. Note that the predetermined allowance can be properly set from the specifications of the communication apparatus and the like.

In this manner, overflow and underflow measurement values are excluded based on a detection result in the overflow/underflow detection circuit 422 from pointer differences detected in the pointer difference detection circuit 421, and a measurement value generated by a temporal frequency variation is excluded in the inflection point detection circuit 423. The resultant pointer differences are supplied to a frequency error calculation circuit 424.

In FIG. 4, the pointer difference is 4,696 after 10 msec, and 5,296 after 20 msec. The data transfer circuit is set to reset the pointer difference to the initial value of 4,096 when the pointer difference reaches 8,192 or more. Note that the initial value and the upper and lower limit values of measurement are not limited to the above-mentioned values, and can be properly set in accordance with an allowable frequency error.

In FIG. 4, the pointer difference changes from 4,696 to 5,296 by +600 during the 10-msec period between the time of 10 msec and the time of 20 msec. A frequency error in this case can be calculated as 600/10 msec=60 kHz. From this result, the line-side clock is estimated to be higher by 60 kHz from the client-side clock. If the pointer difference decreases from the initial value of 4,096 with respect to the time, the line-side clock is estimated to be lower than the client-side clock.

<Estimation of Frequency Error>

A calculation equation for obtaining a frequency error from a pointer difference will be explained. The change amount of the pointer difference in a predetermined period $\Delta t$ (=time t2−time t1) is defined as $\Delta P(t2)-\Delta P(t1)$. The change amount of the pointer difference in the predetermined period $\Delta t$ is proportional to a frequency error between the line-side clock and the client-side clock. By detecting the pointer difference in the predetermined period, a frequency error between the line-side clock and the client-side clock can be calculated from the gradient of the graph of the pointer difference with respect to the time.

A frequency error $\Delta f$ between the line-side clock and the client-side clock is given by:

$$\Delta f = (\Delta P(t2) - \Delta P(t1))/\Delta t \quad (1)$$

This frequency error is calculated by the frequency error calculation circuit 424 in FIG. 3.

As shown in FIG. 5, the change amount of the pointer difference of the FIFO is proportional to the frequency error $\Delta f$. As described above, a frequency error can be estimated from the change amount of the pointer difference of the FIFO. As shown in FIG. 5, a frequency error can be estimated accurately every ppm even in the time of 1 msec.

<Adjustment of Frequency Division Number Using Frequency Error>

The frequency division number adjustment circuit 43 calculates a frequency division number corresponding to the estimated frequency error $\Delta f$, and adjusts the frequency division number of the PLL 44. The rational number frequency division circuit 45 of the PLL 44 performs frequency division using a frequency division number obtained by adding the frequency division number corresponding to the frequency error to the current frequency division number, and controls the client-side clock so as to minimize the frequency error $\Delta f$.

More specifically, the rational number frequency division circuit 45 performs frequency division using a frequency division number obtained by adding/subtracting the frequency division number corresponding to the frequency error $\Delta f$ to/from a current frequency division number N, in order to control the output frequency of the PLL 44 so as to minimize the frequency error $\Delta f$. The PLL 44 can increase the output frequency by increasing the frequency division number of the rational number frequency division circuit 45 to be larger than the current frequency division number, and decrease the output frequency by decreasing the frequency division number to be smaller than the current frequency division number.

In the PLL state before adding/subtracting the frequency division number corresponding to the frequency error $\Delta f$, a frequency f2 of the client-side clock is controlled as represented by:

$$f2 = fr \times N1 \quad (2)$$

where fr is the frequency of the reference clock, and N1 is the frequency division number of the rational number frequency division circuit 45 before adjustment. It is controlled to increase the frequency division number N1 when the line-side clock is estimated to be higher than the client-side clock, and decrease the frequency division number N1 in the opposite case.

The frequency error $\Delta f$ estimated by the frequency error estimation circuit 42 can be associated as a frequency division number in the rational number frequency division circuit 45 with a frequency division number $\Delta N$ given by:

$$\Delta N = \Delta f / fr \quad (3)$$

In this case, the added/subtracted frequency division number $\Delta N$ is also a rational number.

The frequency division number adjustment circuit 43 calculates the frequency division number $\Delta N$ to be added/subtracted to/from the current frequency division number N1, and the rational number frequency division circuit 45 performs frequency division using the adjusted frequency division number (N1+$\Delta N$). This can minimize the frequency error by one control. When the frequency error $\Delta f$ is positive, the line-side clock is higher than the client-side clock, and the frequency division number of the rational number frequency division circuit 45 is set to be N1+$\Delta N$.

To the contrary, when the frequency error $\Delta f$ is negative, the line-side clock is lower than the client-side clock, and the frequency division number of the rational number frequency division circuit 45 is set to be N1−|$\Delta N$|. When $\Delta f$ and $\Delta N$ are calculated including the sign, the frequency division number of the rational number frequency division circuit is set to be N1+$\Delta N$ in either case. The number of digits of N1 and $\Delta N$ can be appropriately set and optimized based on a precision prescribed for the system and the structures of the FIFO and PLL.

<Clock Synchronization Operation of Data Transfer Circuit>

The clock synchronization operation of the data transfer circuit on the premise of a concrete frequency will be explained. Here, a case will be considered in which the frequency of the line-side clock is f1=10.0001 GHz and that of the client-side clock is f2=10.0 GHz. In general, a plurality of bits are processed in parallel, so a clock for parallel processing is low. However, to clarify the operation principle, a case in which no parallel processing is performed will be exemplified.

When the frequency fr of the reference clock is fr=10.0 MHz, the frequency division number N1 of the rational number frequency division circuit in the PLL is $N1=f2/fr=10.0$ GHz/10.0 MHz=1000.00.

When the frequency of the line-side clock is f1=10.0001 GHz and that of the client-side clock is f2=10.0 GHz, a pointer difference between the write pointer and the readout pointer is detected, for example, every 1 msec from the FIFO 41. At this time, assume that a pointer difference at given time t1 is ΔP(t1)=5000, and a pointer difference at time t2 after 10 msec is ΔP(t2)=6000. Also, assume that the initial value of the pointer difference is 4,000.

In this case, the frequency error can be calculated by:

$$\Delta f = (\Delta P(t2) - \Delta P(t1))/(t2 - t1) \quad (4)$$
$$= (6000 - 5000)/10 \text{ ms} = 0.1 \text{ MHz}$$

A frequency division number of the rational number frequency division circuit corresponding to this frequency error can be calculated by:

$$\Delta N = \Delta f/fr = 0.1 \text{ MHz}/10.0 \text{ MHz} = 0.01 \quad (5)$$

The frequency division number ΔN is added to the current frequency division number N1 of the rational number frequency division circuit 45, as represented by:

$$N1 + \Delta N = 1000.00 + 0.01 = 1000.01 \quad (6)$$

The frequency f2 of the output clock of the PLL 44 is controlled as represented by:

$$f2 = fr \times (N1 + \Delta N) \quad (7)$$
$$= 10.0 \text{ MHz} \times 1000.01 = 10.0001 \text{ GHz}$$

By this control of the PLL, the frequency f2 of the client-side clock almost coincides with the frequency f1 of the line-side clock=10.0001 GHZ. Note that there is a slight error depending on the accuracy of the frequency error in the frequency error estimation circuit 42 and the accuracy of the frequency division number ΔN set in the rational number frequency division circuit 45. However, the frequency error measurement time and the number of digits of the decimal part of the frequency division number can be optimized to easily set the error within a desired frequency error by one processing.

In the circuit arrangement, the value of the frequency division number ΔN to be added/subtracted in the rational number frequency division circuit 45 for the frequency error can be calculated in advance. The frequency division number adjustment circuit 43 can be simply constituted by tabulating the value of the frequency division number ΔN as a code value with respect to a frequency error.

When a frequency division number for frequency error correction is set in the PLL 44 by the above-described method, the frequency error becomes very small. However, the error exceeds the allowance after a lapse of time. In this case, the same correction processing is performed. This processing is regarded as almost PI (Proportional-Integral) control.

As described above, the data transfer circuit according to the present invention that transfers data from the line side to the client side using the FIFO can estimate a frequency error directly from a temporal change of a pointer difference between the write pointer and the readout pointer with respect to the FIFO, and adjust the frequency of the readout clock. The data transfer circuit can greatly shorten the synchronization time of clock synchronization.

When estimating a frequency error, the data transfer circuit can exclude an overflow or underflow measurement value of a pointer difference, and a temporal frequency variation from detection of the inflection point of a change of the pointer difference, and improve the accuracy of frequency error estimation. Hence, the data transfer circuit can reduce a residual frequency error after clock synchronization.

INDUSTRIAL APPLICABILITY

The present invention can be used as a data transfer circuit and communication apparatus accompanied by clock synchronization in data communication.

EXPLANATION OF THE REFERENCE NUMERALS AND SIGNS

10 . . . light receiver, 20 . . . . A/D converter, 30 . . . digital signal processing circuit, 40 . . . data transfer circuit, 41 . . . . FIFO, 42 . . . frequency error estimation circuit, 43 . . . frequency division number adjustment circuit, 44 . . . . PLL, 45 . . . rational number frequency division circuit, 46 . . . phase comparison circuit, 47 . . . low-pass filter (LPF), 50 . . . client-side circuit, 100 . . . light receiving device (communication apparatus)

The invention claimed is:

1. A data transfer circuit comprising:
   a memory into which data is written in accordance with a write pointer in synchronization with a first clock, and from which the data is read out in accordance with a readout pointer in synchronization with a second clock;
   a clock generation circuit configured to generate the second clock by multiplying a reference clock by a rational number;
   a frequency error estimation circuit configured to estimate a frequency error between the first clock and the second clock based on a change amount of a pointer difference between the write pointer and the readout pointer; and
   an adjustment circuit configured to output, as an adjustment multiple ΔN, a value obtained by dividing the estimated frequency error by a frequency of the reference clock, to the clock generation circuit,
   wherein the clock generation circuit is configured, when the rational number is N, to update the rational number to (N+ΔN), which is obtained by adding the adjustment multiple ΔN to N.

2. The data transfer circuit according to claim 1, wherein the frequency error estimation circuit is configured to estimate the frequency error based on a change amount of the pointer difference per unit time in a predetermined period.

3. The data transfer circuit according to claim 1, wherein the memory includes a FIFO,
   the clock generation circuit includes a PLL, and
   the PLL includes a rational number frequency division circuit configured to divide a frequency of the second clock using the rational number (N+ΔN).

4. The data transfer circuit according to claim 1, wherein the frequency error estimation circuit includes:
   a pointer difference detection circuit configured to detect the pointer difference between the write pointer and the readout pointer; and
   a reset circuit configured to reset the pointer difference to a center of a predetermined measurement range at a start of detecting the pointer difference.

5. The data transfer circuit according to claim 4, wherein when the pointer difference reaches an upper limit value or lower limit value of the predetermined measurement range, the reset circuit resets the pointer difference to the center of the predetermined measurement range.

6. The data transfer circuit according to claim 1, wherein the frequency error estimation circuit includes a first detection circuit which is configured to detect a specific pointer difference exceeding an upper limit value or lower limit value of a predetermined measurement range, and
   is configured to estimate the frequency error using the pointer difference from which the specific pointer difference is excluded.

7. The data transfer circuit according to claim 1, wherein the frequency error estimation circuit includes a first detection circuit configured to detect a specific frequency error in which a change amount of the frequency error detected every unit time exceeds a predetermined allowance, and
   is configured to exclude the specific frequency error and estimate the frequency error.

8. A communication apparatus comprising a data transfer circuit according to claim 1.

\* \* \* \* \*